United States Patent
Shiban

(10) Patent No.: US 7,488,460 B2
(45) Date of Patent: Feb. 10, 2009

(54) COMBINED CHEMICAL AGENT AND DYNAMIC OXIDATION TREATMENT OF HAZARDOUS GAS

(75) Inventor: Samir S. Shiban, Chandler, AZ (US)

(73) Assignee: Innovative Engineering Solutions, Inc., Chandler, AZ (US)

( * ) Notice: Subject to any disclaimer, the term of this patent is extended or adjusted under 35 U.S.C. 154(b) by 843 days.

(21) Appl. No.: 10/750,902

(22) Filed: Jan. 5, 2004

(65) Prior Publication Data

US 2005/0147548 A1 Jul. 7, 2005

(51) Int. Cl.
*B01D 47/00* (2006.01)

(52) U.S. Cl. .................. 423/210; 588/320

(58) Field of Classification Search ............. 423/210; 588/320
See application file for complete search history.

(56) References Cited

U.S. PATENT DOCUMENTS

| | | | |
|---|---|---|---|
| 4,801,437 A | 1/1989 | Konogaya et al. |
| 4,833,877 A | 5/1989 | Ahland et al. |
| 5,271,908 A | 12/1993 | Shiban et al. |
| 5,353,829 A | 10/1994 | Shiban |
| 5,662,722 A | 9/1997 | Shiban |
| 5,699,826 A | 12/1997 | Shiban |
| 5,759,498 A | 6/1998 | Sheu et al. |
| 5,832,843 A | 11/1998 | Park et al. |
| 5,997,824 A | 12/1999 | Kim |
| 6,030,584 A | 2/2000 | Shiban |
| 6,030,585 A | 2/2000 | Shiban |
| 6,084,148 A | 7/2000 | Shiban et al. |
| 6,153,150 A | 11/2000 | Moore et al. |
| 6,315,960 B1 | 11/2001 | Shiban |
| 6,333,010 B1 | 12/2001 | Holst et al. |
| 6,423,284 B1 | 7/2002 | Arno et al. |
| 6,425,754 B1 | 7/2002 | Lindskog |
| 6,464,944 B1 | 10/2002 | Moore et al. |
| 6,511,641 B2 | 1/2003 | Herman et al. |
| 6,514,471 B1 | 2/2003 | Hsiung et al. |
| 6,544,483 B1 | 4/2003 | Kim |
| 6,627,162 B1 | 9/2003 | Chen |
| 7,033,550 B2 | 4/2006 | Kanno et al. |
| 2001/0000724 A1 | 5/2001 | Choate et al. |
| 2001/0001645 A1 | 5/2001 | Lee et al. |
| 2002/0018737 A1 | 2/2002 | Holst et al. |
| 2002/0081240 A1 | 6/2002 | Kim |
| 2003/0047070 A1 | 3/2003 | Flippo et al. |
| 2003/0049182 A1 | 3/2003 | Hertzler et al. |
| 2003/0138367 A1 | 7/2003 | Brady et al. |
| 2003/0175176 A1 | 9/2003 | Hiroshi et al. |

FOREIGN PATENT DOCUMENTS

| | | |
|---|---|---|
| FR | 9710479 | 1/1999 |
| GB | 2303803 | 7/1999 |
| JP | 7204482 | 8/1995 |
| WO | WO 02/058824 | 8/2002 |

*Primary Examiner*—Edward M Johnson
(74) *Attorney, Agent, or Firm*—James Creighton Wray

(57) ABSTRACT

Hazardous gas abatement apparatus combines and directly couples a chemical agent treatment tank and a dynamic oxidation chamber with a quick connect clamp. Cleaning the chamber and filter and emptying and replacing the chemical agent take place without disconnecting or otherwise disturbing gas, air and exhaust connections.

26 Claims, 2 Drawing Sheets

COMBINED CHEMICAL AGENT AND DYNAMIC OXIDATION TREATMENT OF HAZARDOUS GAS

BACKGROUND OF THE INVENTION

1. Field of the Invention

The present invention relates to a method and apparatus for hazardous gas abatement, for cleaning contaminated gas and for neutralizing other hazardous gasses, such as for example pyrophoric gases. The invention can be used to neutralize, for example, hazardous and pyrophoric gases used in the manufacture of semiconductor devices.

2. Prior Art

Many industries use hazardous and pyrophoric gases for a variety of processes and operations. In the semiconductor industry, a variety of pyrophoric gases are used during the manufacture of semiconductor devices. These gases are termed pyrophoric due to their ability to ignite spontaneously upon contact with an oxidant such as oxygen. Thus, these gases may ignite upon contact with air, and if a pocket of pyrophoric gas contacts air, an explosion may result. The possibility of explosion is increased by the tendency of some pyrophoric gases to "self protect", wherein bubbles or pockets of the pyrophoric gas develop, which prevents reaction or neutralization of the pyrophoric gas in a controlled manner.

Pyrophoric gases are usually used for the deposition of various layers or for introducing dopants into the various layers of a semiconductor device. For example, silane ($SiH_4$) may be used along with oxygen to form a silicon dioxide ($SiO_2$) layer in a chemical vapor deposition (CVD) system. Diborane ($B_2H_4$), phosphine ($PH_3$), and arsine ($AsH_3$) may be used to add dopants to a layer. Silane also is used to form polycrystalline silicon layers as well as epitaxial, single crystal silicon in a variety of processes. Other commonly used pyrophoric gases include halogenated compounds such as dichlorosilane ($SiH_2Cl_2$), among others. Generally, the processes which use these pyrophorics, such as CVD deposition, utilize a flow of the reactant gases through the reactor chamber. Normally, not all of the pyrophorics are spent in the process, and any remaining pyrophorics must be exhausted or pumped out of the reactor. This spent process gas must then be neutralized in a controlled manner so that it is not released into the atmosphere, where it may cause a fire or an explosion upon contact with air. In addition to spent process gas, semiconductor manufacturing operations may have other sources of pyrophoric gas which must be neutralized. For example, the pyrophoric gas pump or pipe panel may be purged with nitrogen, and the exhaust line for the pump or panel must then be neutralized.

In the prior art, several systems exist for neutralizing a gas stream containing one or more pyrophoric gases. Many of these systems are "active" in that they provide a flame and reaction chamber through which pass the pyrophoric, as well as flammable and/or toxic gases in the spent gas. The flame ensures combustion of nearly all pyrophoric gas, thus virtually eliminating the possibility of a sufficient accumulation of the pyrophoric gas to cause an explosion. To ensure a constant flame, a fuel source, such as hydrogen ($H_2$) or natural gas ($CH_4$) is ignited by, for example, spark plugs.

Examples of such systems include "The Sergeant", manufactured by Custom Engineered Material, Inc. and "The Guardian", manufactured by ATMI Ecosys Corp. These systems are often referred to in the art as "burn boxes."

Another prior art system is a dilution system. In a dilution system, the gas stream containing the pyrophoric gas is first diluted in an inert gas such as nitrogen ($N_2$) in a ratio of approximately 100:1 (inert:spent process gas) by volume. This diluted gas stream is then combined with air in a reaction tube to allow the pyrophoric gas in the diluted gas stream to react with the oxygen in air. Because of the massive dilution of the spent gas stream prior to exposure to air, there is little possibility of explosion.

The aforementioned prior art systems have several drawbacks. The active systems are complex and expensive, requiring a large capital outlay. The high cost is especially significant, since most facilities require several of these items. In addition, the use of fuel such as $H_2$ or natural gas creates additional ongoing operational expenses. Also, these systems require that the fuel source, which is a flammable gas be piped to each system installed, thereby incurring additional capital outlays and presenting an additional fire hazard. The dilution type systems, while not as complex as the active systems, are expensive to operate due to the large volume of inert gas used. Also, the dilution systems will not ensure complete reaction due to possible streamlining of the pyrophoric gas in the event of a sudden release, resulting in a potential for explosion.

In prior U.S. Pat. Nos. 5,271,908 and 6,084,148 the applicant introduced methods and apparatus for neutralizing pyrophoric gas.

Needs still exist for improved systems for neutralizing, pacifying and cleaning contaminated chemical process exhaust and waste gasses.

Needs exist for improved systems, which efficiently neutralize chemical process contaminates in gas. The system should ensure complete or substantially complete neutralization and pacification of any out flowing contaminant gas in the gas stream to be neutralized. Needs exist for systems that are simple and inexpensive to build and to operate and that do not require a fuel source to operate.

Needs exist for systems that are capable of handling spent process gas streams that have contaminate gas concentrations from trace to substantial amounts in volumes of cubic centimeters to several tens or hundreds of liters per minute.

SUMMARY OF THE INVENTION

The present invention uniquely combines chemical agent purification and pacification with dynamic oxidation for gas contaminant abatement in process gas exhaust streams.

Uniquely, a chemical agent tank and an oxidation chamber are combined in a single housing. The contaminated process gas or the out flowing spent process gas with aggressive, dangerous, flammable or explosive components are passed into a chemical agent tank through multiple distribution heads to ensure wide distribution throughout the tank. The gas then passes through the chemical agent, which is in solution or suspension in a liquid or fluid or which is in granular form or dispersed in a matrix or granular mix.

The treated discharged gas flows out through a foraminous or porous collector and is drawn into an airflow inlet by a venturi effect. A large air inlet has a centered smaller treated gas outflow pipe. Air flowing through the air inlet draws gas through a perforated treated gas outflow pipe in the chemical agent treatment tank. The inflowing air and treated gas flow through a screen to trap any chemical agent entrained in the treated gas stream and into a large dynamic oxidation chamber, where the air and the treated gas thoroughly mix. All oxidizable components in the treated gas are oxidized by the oxygen in the air flowing in and around the dynamic oxidation chamber.

Finally the air and the oxidized treated gas flow through walls of a large filter and out through an air outlet.

In one preferred form of the invention, dividers extend in opposite directions in the tank to promote sinuous flow of the hazardous gas throughout the tank. For example, in one embodiment a gas inlet is positioned in the top near one side of the tank. First and third vertical dividers extend from the top to positions spaced slightly upward from the bottom of the tank. An intermediate second divider extends upward from a middle of the tank to a position near the top. The incoming gas flows through the chemical agent, first downward between the first divider and a tank wall, then upward, then downward along first and second sides of the second, middle divider, then upward between the third divider and the wall to an outlet near the top. The sinuous flow ensures maximum contact with the chemical agent.

The tank drain is positioned beneath the middle divider to fully drain the tank by draining both sides of the middle divider.

The divided tank is particularly useful when the chemical agent is in a fluid. When the chemical agent is not dispersed in a liquid, additional fill and drain parts are useful.

In a preferred embodiment, the two parts of the processor for neutralizing, cleaning and oxidizing the off gas are connected in a single housing.

In one preferred embodiment the chemical agent tank is stacked on top of the oxidation chamber. The two elements are connected together by a quick connect and disconnect clamp.

The chemical agent tank is a closed tank with a large chemical agent fill port in the top and a large chemical agent drain port in the bottom. Multiple gas inlets are provided in the top. A chemical agent, for example activated charcoal, fills the tank up to a short distance from the top, which acts as a plenum to distribute the incoming gas uniformly through the chemical agent.

The gas migrates through the agent, which removes contaminate compounds, particles and elements. Then the gas migrates to a porous pipe, which leads to a cleaned gas outlet.

The gas outlet is connected to an air inlet, which directs the cleaned gas and air into the oxidation chamber. A screen extends over a part of the top of the oxidation chamber below the air and gas inlet to enhance turbulence and to discourage laminar flow so that the oxygen in the air mixes thoroughly with the incoming cleaned gas to oxidize contaminate compounds, elements, and/or particles remaining in the gas. The screen also traps entrained particles in the gas and prevents them from entering the oxidation chamber.

The oxidation chamber is an open top tank, which fits directly beneath the chemical agent tank. The top of the oxidation chamber and the bottom of the chemical agent tank have complementary outward extending flanges, which fit within the inward opening C-shaped cross section of the clamping band which surrounds the tanks. A hook on one end of the clamp engages a lever on the other end of the clamp to form a quick acting hold over the center clamp.

The oxidizer chamber has a large empty void in a preferred embodiment to promote the open contact of the air with the gas. Some embodiments have baffles to promote mixing and non laminar flow.

A large filter in the chamber has walls, which remove all particles, dust and solid products of combustion and fine particles entrained in the gas. In preferred embodiments the large filter has a cross section similar to a cross section of the chamber, has a size that substantially fills the chamber and is offset in the chamber for encouraging flow over the entire surface of the filter. The large filter has a plate or filter material wall at its bottom surface. A large plate covers the top of the filter. An air outlet is connected to the plate for releasing the cleaned, treated and oxidized gaseous products and the air.

For maintenance the lever is lifted and the clamp is removed. The chemical agent tank and the oxidizing chamber are separated. The plate is removed from the top of the filter, and the filter is exchanged or cleaned and replaced. If necessary the chemical agent drain port covering plate is unbolted and removed, and the chemical agent is emptied from the tank. Then the covering plate is replaced. Fresh or rejuvenated chemical agent is added through the fill port, and the fill port cover is replaced. The screen is inspected and cleaned or replaced as necessary. The filter cover plate is replaced on the filter and the air inlet and exhaust line are reconnected if they have been detached. The clamp is reinstalled around the flanges, and the lever is engaged and locked. The renewed combined chemical agent and dynamic oxidation apparatus is ready to return on line. All of the maintenance and replacement has been accomplished without disconnecting or otherwise disturbing the spent process gas input lines. All that is necessary is to shut off an inflow valve or to connect the supply to a parallel combined processor.

In a preferred embodiment a blower supplies air under pressure to the air inlet. A pitot tube in the air inlet measures velocity of the incoming air. A reduction in air input velocity may indicate a need for maintenance or filter replacement. The treated gas out flow pipe from the chemical agent treatment tank is centered in the air inflow pipe, which creates a negative pressure in the treated gas outlet and draws treated gas from the chemical agent tank into the inflowing air stream. Blowing the gas and air through the screen promotes turbulence and mixing.

Alternatively the pressure and speed of the air flowing through the chemical agent and out of the outlet draws fresh air in through the air inlet. A pitot tube in the inlet indicates that air is being drawn through. The flow of treated gas through the treated gas outlet pipe creates suction in the air inflow pipe, drawing in air. Flow of the gas and the air through the oxidizer chamber inlet screen mixes the gases and starts oxidation. The screen has the additional effect of encouraging any rapid oxidation to occur in the confines of the oxidation chamber.

The air inflow pipe and air outflow pipes which supply and remove air and gasses to and from the oxidation chamber are L-shaped. Horizontal parts of the L's extend inward through sidewalls of the chemical agent tank. Vertical legs of the L-shaped pipes extend vertically downward into the dynamic oxidation chamber to simplify maintenance. After unclamping, the lower chamber is dropped without disturbing the connections of the air supply to the inlet or blower and without disturbing the connections of the outflow exhaust to a conventional scrubber. The outflow pipe disconnects from the filter covering plate to allow the plate to be lowered or rotated out of the way of plate covering the chemical agent drain port.

The present invention has the added advantage that the heat generated by oxidation in the oxidizer chamber is transferred directly to and absorbed by the chemical agent and the gas in the chemical agent treatment tank, improving the operations in that tank by heating the elements.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
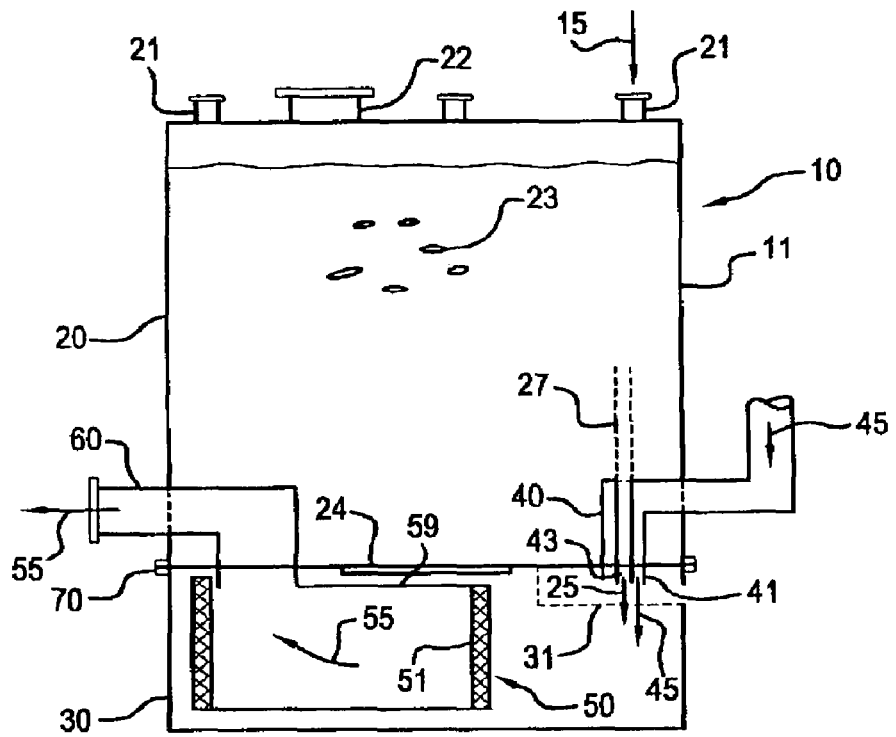
FIG. 1 is a schematic vertical cross sectional representation of a combined chemical agent and dynamic oxidation treatment apparatus for hazardous or contaminated gas treatment.

FIG. 1 shows a schematic vertical cross section of a combined chemical agent and dynamic oxidation treatment apparatus 10 for treating hazardous or contaminated gas 15. The present invention combines chemical agent purification and pacification with dynamic oxidation for gas contaminant abatement in process gas exhaust streams.

A chemical agent tank 20 and an oxidation chamber 30 are combined in a single housing 11. The contaminated process gas or the out flowing spent process gas 15 with hazardous, aggressive, dangerous, flammable or explosive components are passed into chemical agent tank 20 through multiple distribution heads in gas inlets 21 to ensure wide distribution throughout the tank 20. The gas then passes through the chemical agent 23, which is a high surface area activated charcoal or other chemical agents in solution or suspension, in a liquid or fluid or in granular form or dispersed on or in a matrix or a granular mix.

The treated discharged gas 25 flows out through a foraminous or porous collector 27 and is drawn into an airflow inlet 40 by a venturi effect. A large air inlet pipe 41 has a centered smaller chemically treated gas outflow pipe 43. Air flowing through the air inlet pipe 41 draws treated gas through a perforated treated gas outflow pipe 27 in the chemical agent treatment tank 20. The inflowing air 45 and treated gas 25 flow through a screen 31 in the chamber 30 to trap any solids or solid chemical agent entrained in the treated gas stream 25 and into a large dynamic oxidation chamber 30, where the air 45 and the treated gas 25 thoroughly mix. All oxidizable components in the treated gas are oxidized by the oxygen in the air flowing in and around the dynamic oxidation chamber 30.

Finally the air and the oxidized treated gas 55 flow through walls 51 of a large filter 50 and out through an air and treated gas outlet 60.

In a preferred embodiment, the two main parts 20,30 of the processor 10 for neutralizing, abating, cleaning and oxidizing the off gas are connected in a single housing 11.

In one preferred embodiment the chemical agent tank 20 is stacked on top of the dynamic oxidation chamber 30. The two elements 20,30 are connected together by a quick connect and disconnect clamp 70.

The chemical agent tank 20 is a closed tank with a large chemical agent fill port 22 in the top and a large chemical agent drain port 24 in the bottom. Multiple gas inlets 21 are provided in the top. A chemical agent 23, for example activated charcoal, fills the tank up to a short distance from the top, which acts as a plenum to distribute the incoming gas uniformly through the chemical agent.

The gas 15 migrates through the agent 23, which removes hazardous contaminating compounds, particles and elements. Then the gas migrates to a porous pipe 27, which leads to a cleaned gas outlet conduit 43.

Figure 2:
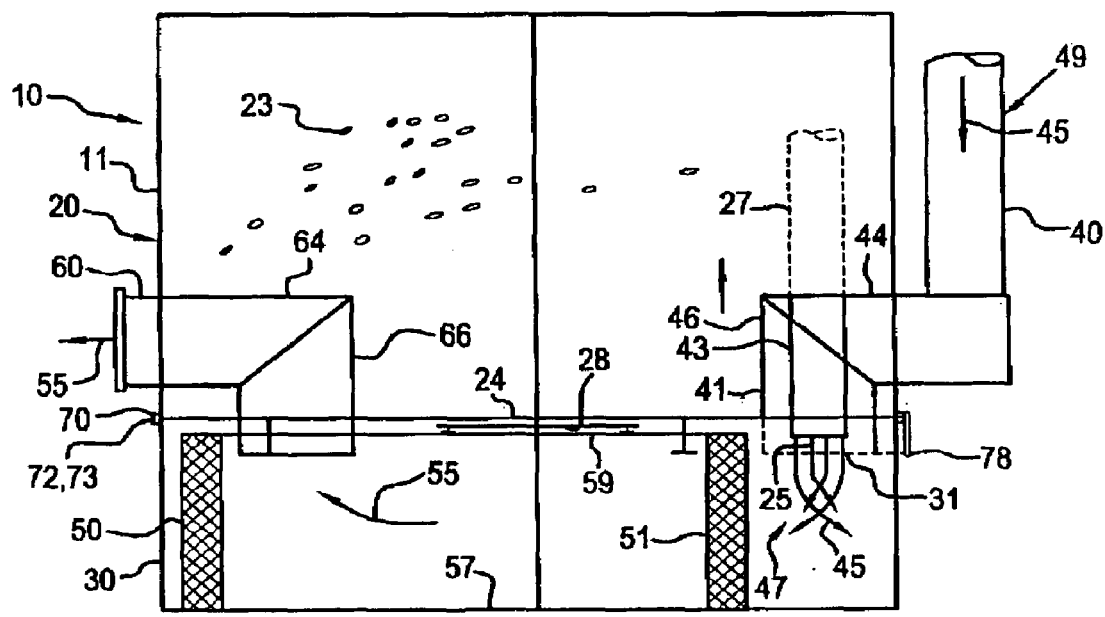
FIG. 2 is a schematic vertical cross sectional representation of the combined chemical agent and dynamic oxidation treatment apparatus for hazardous or contaminated gas shown in FIG. 1 showing the internal parts.

FIG. 2 is a schematic vertical cross sectional representation of the combined chemical agent and dynamic oxidation treatment apparatus 10 for abatement of hazardous or contaminated gas 15, as shown in FIG. 1. FIG. 2 shows the internal parts of the tank 20 and chamber 30 in greater detail.

The gas outlet 43 is connected to an air inlet 41, which directs the cleaned gas 25 and air 45 into the oxidation chamber 30. A screen 31 extends over a part of the top of the oxidation chamber 30 below the air and gas inlets 41,43 to enhance turbulence and to discourage laminar flow, so that the oxygen in the air 45 mixes thoroughly with the incoming cleaned gas 25 to oxidize any hazardous contaminating compounds, elements, and/or particles remaining in the gas. The screen 31 also traps entrained particles in the gas 25 and prevents them from entering the oxidation chamber 30.

The oxidation chamber 30 is a large open top bowl, which fits directly beneath the chemical agent tank 20. The top of the oxidation chamber and the bottom of the chemical agent tank have complementary outward extending flanges 72,73, which fit within the inward opening C-shaped cross section 74 of the clamping band 76 of clamp 70, which surrounds the flanges.

A hook on one end of the clamp engages a lever on the other end of the clamp to form a quick acting over the center clamp 70.

The oxidizer chamber 30 has a large empty void in a preferred embodiment to promote the open contact of the air 45 with the gas 25. Some embodiments have baffles to promote turbulence and mixing and non laminar flow of the air and gas.

Figure 3:
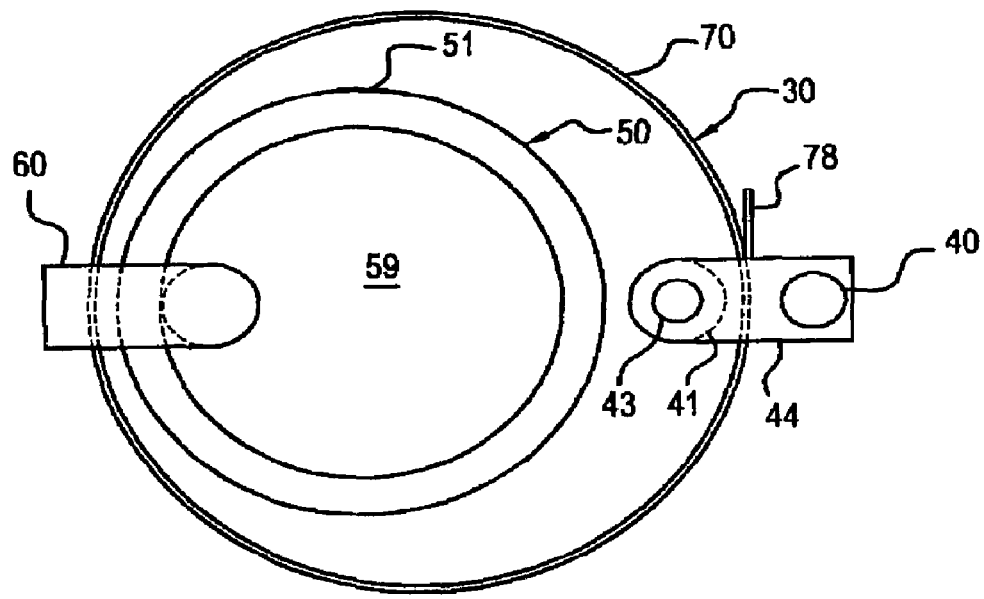
FIG. 3 is a schematic horizontal cross sectional representation of the combined chemical agent and dynamic oxidation treatment apparatus shown in FIGS. 1 and 2 for the combined treatment of hazardous or contaminated gas.

FIG. 3 is a horizontal cross section of the combined chemical agent and dynamic oxidation treatment apparatus 10 shown in FIGS. 1 and 2 for the combined treatment of hazardous or contaminated gas 15.

A large filter 50 in the chamber 30 has walls 51, which remove all particles and dust and solid products of combustion and fine particles entrained in the exiting gas. In preferred embodiments the large filter 50 has a cross section similar to a cross section of the chamber 30, has a size that substantially fills the chamber, and is offset in the chamber for encouraging flow over the entire surface of the filter. The large filter 50 has a plate 57 or filter material wall at its bottom surface. A large plate 59 covers the top of the filter. An air and treated gas outlet 60 is connected to the plate 59 for releasing the cleaned, treated and oxidized gaseous products and the air.

For maintenance the lever 78 is lifted, and the clamp 70 is removed. The chemical agent tank 20 and the oxidizing chamber 30 are separated. The plate 59 is removed from the top of the filter, and the filter 50 is exchanged or cleaned and replaced. If necessary the chemical agent drain port plate 28 is unbolted and removed, and the chemical agent 23 is emptied from the tank 20. Then the covering plate 28 is replaced. Fresh or rejuvenated chemical agent 23 is added through the fill port 22 (FIG. 1), and the fill port cover 26 is replaced. The screen 31 is inspected and cleaned or replaced as necessary. The filter cover plate 59 is replaced on the filter 50, and the exhaust line 60 is reconnected if it has been detached. The clamp 70 is reinstalled around the flanges 72,73, and the lever is engaged and locked. The renewed combined chemical agent and dynamic oxidation apparatus 10 is ready to return on line. All of the maintenance and replacement is accomplished without disconnecting or otherwise disturbing the spent process gas input lines 21 and the treated gas and air inlet lines 43 and 41. All that is necessary is to shut off an inflow valve or to close and open valves connecting the hazard gas supply to a parallel combined processor 10.

In a preferred embodiment a blower supplies air under pressure to the air inlet 40. A pitot tube 49 in the air inlet 40 measures velocity of the incoming air. A reduction in air input velocity may indicate a need for maintenance or filter cleaning or replacement. The treated gas out flow pipe 43 from the chemical agent treatment tank 20 is centered in the air inflow pipe 41, which creates a negative pressure in the treated gas outlet and draws treated gas from the chemical agent tank 20 into the inflowing air stream 45. Blowing the gas and air through the screen 31 promotes turbulence and mixing 47 in the dynamic oxidation chamber 30.

Alternatively the pressure and speed of the gas flowing through the chemical agent 23 and out of the outlet 43 draws fresh air 45 in through the air inlet 41. The flow of treated gas through the treated gas outlet pipe 43 creates suction in the air inflow pipe 41, drawing in air. A pitot tube 49 in the inlet 41 indicates that air is being drawn through. Flow of the gas and the air through the oxidizer chamber inlet screen 31 mixes gasses and air and starts oxidation. The screen 31 has the additional effect of encouraging any rapid oxidation to remain in the confines of the oxidation chamber 30.

The air inflow pipe 41 and air outflow pipe 60 which supply and remove air and gasses to and from the oxidation chamber 30 are L-shaped in preferred embodiments. Horizontal parts 44,64 of the L's extend inward through sidewalls of the chemical agent tank 20. Vertical legs 46,66 of the L-shaped pipes extend vertically downward into the dynamic oxidation chamber 30. That simplifies maintenance. After unclamping, chamber 30 is lowered without disturbing the connections of the air supply to the inlet or blower and without disturbing the connections of the outflow exhaust 60 to a conventional scrubber.

Placing the dynamic oxidizer chamber below the chemical agent tank has the effect of removing excess heat from the chamber and preheating the gas moving through the chemical agent to enhance absorption of elements and compounds.

Figure 4:
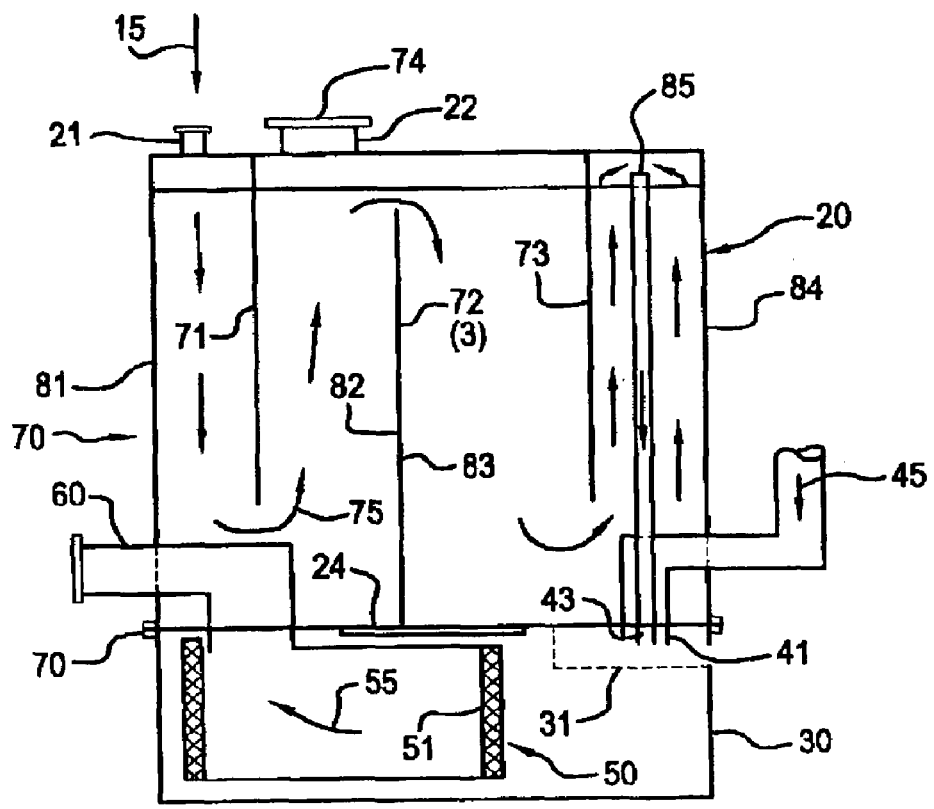
FIG. 4 shows a modification of the apparatus in which three dividers are placed in the chemical agent tank.

FIG. 4 shows a modification 70 of the apparatus in which three dividers 71, 72, 73 are placed in the chemical agent tank 20.

A combined chemical agent and dynamic oxidation apparatus 70 has dividers 71, 72, 73 which extend in opposite directions in the tank 20 to promote sinuous flow 75 of the hazardous gas throughout the tank. In one embodiment, a gas inlet 74 is positioned in the top near one side of the tank. First and third vertical dividers 71, 73 extend from the top 76 to positions spaced slightly upward from the bottom 78 of the tank 20. An intermediate second divider 72 extends upward from a middle of the tank bottom 78 to a position near the top 76. The incoming gas 15 flows through the chemical agent, first downward between the first divider 71 and a tank wall 81, then upward, then downward along first and second sides 82 83 of the second, middle divider 72, then upward between the third divider 73 and the wall 84 to an outlet 85 near the top. The sinuous flow 75 ensures maximum contact with the chemical agent.

The tank drain 24 is positioned beneath the middle divider 72 to fully drain the tank by draining both sides of the middle divider 72.

The divided tank is particularly useful when the chemical agent is in a fluid or liquid. When the chemical agent is not dispersed in a liquid, additional fill 22 and drain 24 parts are useful.

While the invention has been described with reference to specific embodiments, modifications and variations of the invention may be constructed without departing from the scope of the invention, which is defined in the following claims.

I claim:

1. Gas treatment apparatus comprising, a combined chemical agent treatment container and a dynamic oxidizer connected to the chemical agent treatment container, the chemical agent treatment container further comprising a fill port for filling the chemical agent treatment container with chemical agent, a drain port for emptying spent chemical agent from the chemical agent treatment container, at least one gas inlet connected to the chemical agent treatment container for admitting gas to be treated to the container, a gas transfer conduit for removing chemical agent treated gas from the container, and wherein the dynamic oxidizer further comprises a chamber connected to the container, wherein the gas transfer conduit is connected to the chamber for supplying gas flowing out of the container to the chamber, an oxygen inlet connected to the chamber for supplying oxygen to the chamber and oxidizing oxidizable components of the gas flowing from the container to the chamber, and a gas outlet connected to the chamber for flowing chemical agent treated and oxidized gas from the chamber.

2. The gas treatment apparatus of claim 1, further comprising a clamp for connecting the chemical agent container to the oxidizer chamber.

3. The gas treatment apparatus of claim 2, wherein the container further comprises a tank positioned above the chamber, and wherein the chamber further comprises a dynamic oxidizer chamber.

4. The gas treatment apparatus of claim 3, further comprising a first flange around a bottom of the tank, and a second complementary flange around a top of the dynamic oxidizer chamber, and wherein the clamp is a quick connect clamp for engaging the first and second flanges and for quickly connecting and disconnecting the clamp from the flanges for connecting the chamber with the tank and for separating the chamber from the tank.

5. The gas treatment apparatus of claim 4, further comprising a filter in the chamber and wherein the gas outlet is connected to an inside of the filter.

6. The gas treatment apparatus of claim 5, further comprising a screen in a top of the chamber and wherein the gas transfer conduit and the oxygen inlet are directed toward the screen for flowing gas and oxygen through the screen into the chamber.

7. The gas treatment apparatus of claim 6, wherein the oxygen inlet comprises an air inlet for mixing oxygen in the air with the gas in the chamber.

8. The gas treatment apparatus of claim 7, wherein the gas transfer conduit is positioned within the air inlet for flowing gas and air toward the screen.

9. The gas treatment apparatus of claim 8, further comprising a pitot tube in the air inlet for measuring air flowing through the air inlet into the chamber.

10. The gas treatment apparatus of claim 9, wherein the chemical agent drain port is above the chamber for removing chemical agent after the chamber has been removed, and further comprising a removable cover plate on the chemical agent drain port.

11. The gas treatment apparatus of claim 10, wherein the filter is a large filter, which occupies about half of the chamber and further comprising a filter plate covering the filter, and wherein the gas outlet is connected to the filter plate.

12. The gas treatment apparatus of claim 11, wherein the air inlet and the gas outlet are tubes which extend into and through and out of the bottom of the chemical agent tank and into a top of the dynamic oxidation chamber, wherein the chamber may be removed from the tank without disturbing connections of the air inlet and the gas outlet.

13. The gas treatment apparatus of claim 12, wherein the air inlet and the gas outlet tubes are L-shaped and extend into the tank through sides of the tank.

14. Gas treatment method comprising, providing a combined chemical agent treatment container and a dynamic oxidizer, connecting the chemical agent treatment container to the dynamic oxidizer, providing on the chemical agent treatment container a fill port, filling the chemical agent treatment container with chemical agent, providing a drain port, emptying spent chemical agent from the chemical agent treatment container through the drain port, providing at least one gas inlet connected to the chemical agent treatment container admitting gas to be treated to the container, providing a gas transfer conduit, removing chemical agent treated gas from the container through the transfer conduit, providing the dynamic oxidizer with a chamber connected to the container, connecting the gas transfer conduit to the chamber, flowing gas out of the container to the chamber through the transfer conduit, providing an oxygen inlet connected to the chamber, supplying oxygen to the chamber through the oxygen inlet, oxidizing oxidizable components of the gas flowing from the container in the chamber, providing a gas outlet connected to the chamber, and flowing chemical agent treated and oxidized gas from the chamber.

15. The gas treatment method of claim 14, further comprising providing a clamp and connecting the chemical agent container to the oxidizer chamber with the clamp.

16. The gas treatment method apparatus of claim 15, wherein the container further comprises providing a tank positioned above the chamber, and wherein providing the chamber further comprises providing a dynamic oxidizer chamber.

17. The gas treatment method of claim 16, further comprising providing a first flange around a bottom of the tank, and providing a second complementary flange around a top of the dynamic oxidizer chamber, and wherein providing the clamp is providing a quick connect clamp, engaging the first and second flanges and quickly connecting and disconnecting the clamp from the flanges and thereby connecting the chamber with the tank and separating the chamber from the tank.

18. The gas treatment method of claim 17, further comprising providing a filter in the chamber and connecting the gas outlet to an inside of the filter.

19. The gas treatment method of claim 18, further comprising providing a screen in a top of the chamber and directing the gas transfer conduit and the oxygen inlet toward the screen, and flowing gas and oxygen through the screen into the chamber.

20. The gas treatment method of claim 19, wherein providing the oxygen inlet comprises providing an air inlet, and mixing oxygen in the air with the gas in the chamber.

21. The gas treatment method of claim 20, further comprising providing the gas transfer conduit within the air inlet, and flowing gas and air toward the screen.

22. The gas treatment method of claim 21, further comprising providing a pitot tube in the air inlet, and measuring air flowing through the air inlet into the chamber.

23. The gas treatment method of claim 22, wherein the chemical agent drain port is provided above the chamber for removing chemical agent after the chamber has been removed, and further comprising providing a removable cover plate on the chemical agent drain port.

24. The gas treatment method of claim 23, wherein providing the filter is providing a large filter which occupies about half of the chamber and further comprising providing a filter plate covering the filter, and connecting the gas outlet is to the filter plate.

25. The gas treatment method of claim 24, wherein providing the air inlet and the gas outlet further comprises providing tubes which extend into and through the chemical agent tank and out the bottom of the chemical agent tank and into a top of the dynamic oxidation chamber, and removing the chamber may from the tank without disturbing connections of the air inlet and the gas outlet.

26. The gas treatment method of claim 25, wherein providing the air inlet and the gas outlet tubes comprises providing L-shaped tubes and extending the tubes into the tank through sides of the tank.

* * * * *